(12) United States Patent
Wunderlich et al.

(10) Patent No.: US 9,347,479 B2
(45) Date of Patent: May 24, 2016

(54) METHOD AND PAIR OF PINCHING JAWS FOR PRODUCING A DRILLING TIP

(71) Applicant: Adolf Wuerth GmbH & Co. KG, Kuenzelsau (DE)

(72) Inventors: Andreas Wunderlich, Kupferzell (DE); Rainer Eckert, Weikersheim (DE)

(73) Assignee: Würth International AG, Chur (CH)

( * ) Notice: Subject to any disclaimer, the term of this patent is extended or adjusted under 35 U.S.C. 154(b) by 385 days.

(21) Appl. No.: 14/039,399

(22) Filed: Sep. 27, 2013

(65) Prior Publication Data

US 2014/0112735 A1    Apr. 24, 2014

(30) Foreign Application Priority Data

Oct. 19, 2012   (DE) .......................... 10 2012 219 121

(51) Int. Cl.
  *B21K 1/56*  (2006.01)
  *F16B 25/10*  (2006.01)
  *B21K 5/02*  (2006.01)

(52) U.S. Cl.
  CPC ................ *F16B 25/103* (2013.01); *B21K 1/56* (2013.01); *B21K 5/02* (2013.01)

(58) Field of Classification Search
  CPC ............. B21K 1/46; B21K 1/56; B21K 5/02; B21K 5/04; B21K 1/44; F16B 25/103
  USPC ...................... 470/34, 40, 192, 195
  See application file for complete search history.

(56) References Cited

U.S. PATENT DOCUMENTS

| | | | | |
|---|---|---|---|---|
| 3,204,516 A | | 9/1965 | Wieber | |
| 3,241,426 A | * | 3/1966 | Gutshall | B21K 1/46 408/199 |
| 3,463,045 A | * | 8/1969 | Prescott | B21K 1/56 411/387.8 |
| 3,550,255 A | * | 12/1970 | Skierski | B21H 3/027 29/557 |
| 3,747,143 A | * | 7/1973 | Eager | B21H 3/027 411/387.6 |
| 5,980,390 A | | 11/1999 | Ferrante | |
| 8,192,124 B2 | | 6/2012 | Wolpert et al. | |

FOREIGN PATENT DOCUMENTS

| | | |
|---|---|---|
| DE | 10 2010 041 164 A1 | 3/2012 |
| DE | 10 2011 005 862 A1 | 9/2012 |
| JP | H01274930 A | 11/1989 |
| JP | H0596424 A | 4/1993 |
| JP | 3178588 U | 9/2012 |

* cited by examiner

*Primary Examiner* — Edward Tolan
(74) *Attorney, Agent, or Firm* — Boyle Fredrickson, S.C.

(57) ABSTRACT

A method for integrally forming a drilling tip on a wire nail, in particular in order to produce a screw with the aid of a pair of pinching jaws, provides for the bulge formed by the displaced material during the integral forming of the drilling tip to be sheared off the drilling tip along the entire length of the cutting edges of the drilling tip produced and to be left connected to the drilling tip only along the longitudinal side edges of the latter by a predetermined breaking point.

9 Claims, 2 Drawing Sheets

METHOD AND PAIR OF PINCHING JAWS FOR PRODUCING A DRILLING TIP

TECHNICAL FIELD

The invention relates to a method for producing drilling tip and a pair of pinching jaws for producing a drilling tip.

DESCRIPTION OF THE BACKGROUND ART

It is known that screws can be provided with a drilling tip which makes it possible for the screw to be screwed in without pre-drilling. Such drilling tips as a rule have two cutting edges which are arranged at an obtuse angle. In order to produce such a drilling tip, it is known to arrange the screw end between two jaws which are then moved together abruptly. The material displaced in the process forms a bulge. This bulge is not intended to be separated from the finished drilling tip, since during the ejection of a finished screw or of a blank, the latter is intended to be protected by the bulge.

In the currently conventional manufacturing method, the bulge is connected to the produced drilling tip on all sides by a separation point at which the material is so thin that after the ejection of the blank the bulge can be separated from the drilling tip by a rotary movement. However, during this separation, a separation plane provided with a burr is produced. For example, the material is deformed at the subsequent separation point to a thickness of 0.1 mm such that after the bulge has been detached a burr of about 0.1 mm to 0.2 mm remains. Such a burr forms an impairment of the cutting edge of the drilling tip, such that the screwing-in times for the screwing in of screws with such drilling tips are increased.

SUMMARY OF THE INVENTION

The invention is based on the object of creating a possibility of achieving an improvement in the screwing-in times or the drilling that precedes the screwing-in operation.

In order to achieve this object, the invention proposes a method having a screw and a pair of pinching jaws.

Similarly to in the prior art, after the demoulding of the drilling tip, the bulge remains fastened to the drilling tip such that said bulge continues to protect the latter after ejection. However, the burr exists only on the two axial longitudinal sides of the drilling tip, and so the two cutting edges which are responsible for drilling can be produced virtually without a burr. The burr which is still present on the longitudinal edges is not disruptive there.

In order to separate the bulge from the cutting edges of the drilling tip, provision can be made in a development of the invention for shearing to take place there. Cutting and/or punching or combinations of these possibilities are also possible.

In particular, provision can be made in a development of the invention for the separation of the bulge from the wire nail or from the formed drilling tip to extend along at least a portion of the cutting edges and preferably the entire length of the cutting edges of the drilling tip.

In a further configuration of the invention, provision can be made for the two pinching jaws which are used to produce the drilling tip to be formed in an identical manner, that is to say with an identical structure.

The invention also proposes a pair of pinching jaws by way of which such a drilling tip can be produced, in particular the drilling tip of a self-drilling screw.

According to the invention, the pair of pinching jaws consists of two pinching jaws which each have a depression which forms the negative form of the drilling tip in the closed state of the two pinching jaws, i.e. when the latter rest against one another. The depression is surrounded in each pinching jaw by a receiving space into which the displaced material flows in order to form the bulge. In this case, the boundary between the depression and the receiving space along the subsequent longitudinal side edges of the drilling tip is formed such that in the closed state of the two pinching jaws these boundaries do not come into contact but are at a distance which ensures that the material is not severed there. On the other hand, the boundary between the depression and the receiving space along the subsequent cutting edges of the drilling tip is formed such that a separation between the drilling tip and the bulge takes place there.

In a development, provision can be made for a pinching edge to be located opposite a surface along the subsequent longitudinal sides of the drilling tip.

In a development, provision can be made for the boundary between the depression and the receiving space along the cutting edges of the drilling tip to have a cutting edge or shearing edge in the case of at least one pinching jaw. This is intended to ensure that shearing between the drilling tip and the bulge takes place at this point.

It has been found to be particularly expedient if, in a development of the invention, the two pinching jaws are identical or have an identical structure.

The invention also proposes a screw having a drilling tip, in the case of which the drilling tip is producible by the method described here and/or using the pinching jaws described herein.

BRIEF DESCRIPTION OF THE DRAWINGS

Further features, details and advantages of the invention can be gathered from the claims and the abstract, the wording of both of which is hereby incorporated in the description by way of reference, from the following description of preferred embodiments of the invention and by way of the drawing, in which:

DETAILED DESCRIPTION

Figure 1:
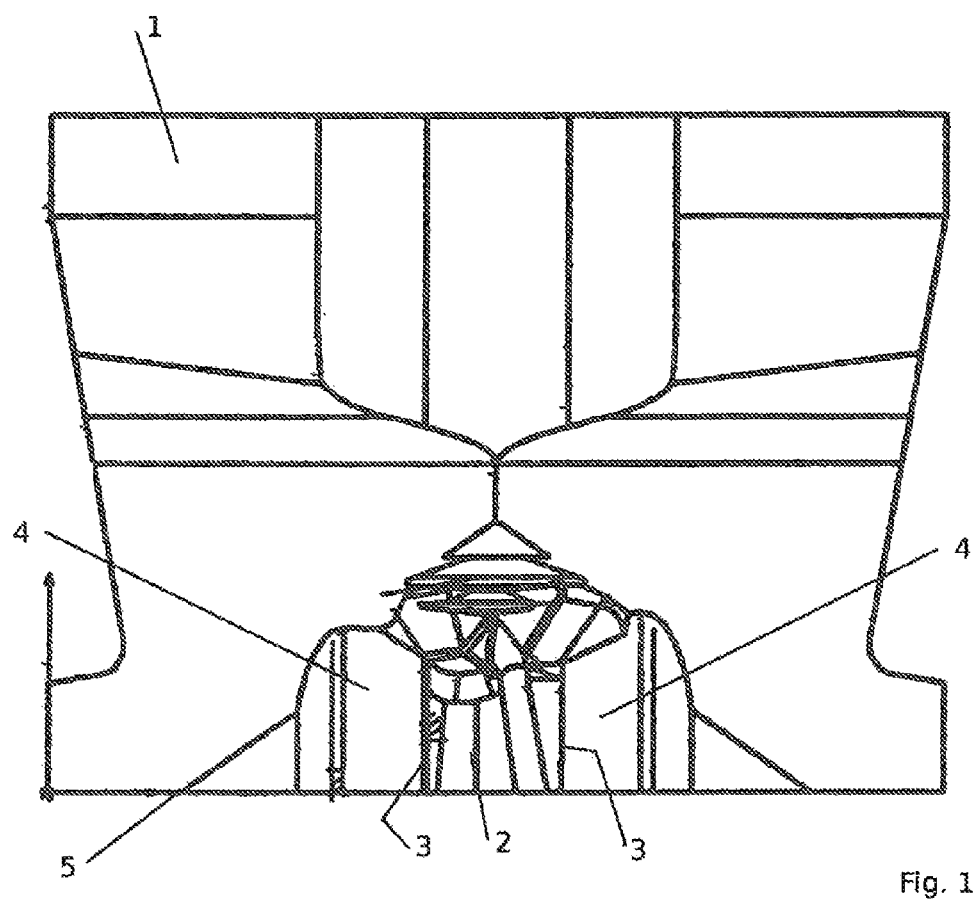
FIG. 1 shows the view of the inner side of a pinching jaw on an enlarged scale.

FIG. 1 shows one pinching jaw of a pair of pinching jaws as viewed from the other pinching jaws. The pinching jaw 1 is oriented in the drawing such that the wire nail, the end of which is intended to be provided with a drilling tip, projects from below into the depression 2. The depression 2 is surrounded to the right and left by a receiving space 4 by way of in each case one pinching edge 3. The depression 2 is open towards the underside 5, illustrated at the bottom of FIG. 1, of the pinching jaw 1. The receiving space 4 is also present above the depression 2.

Figure 2:
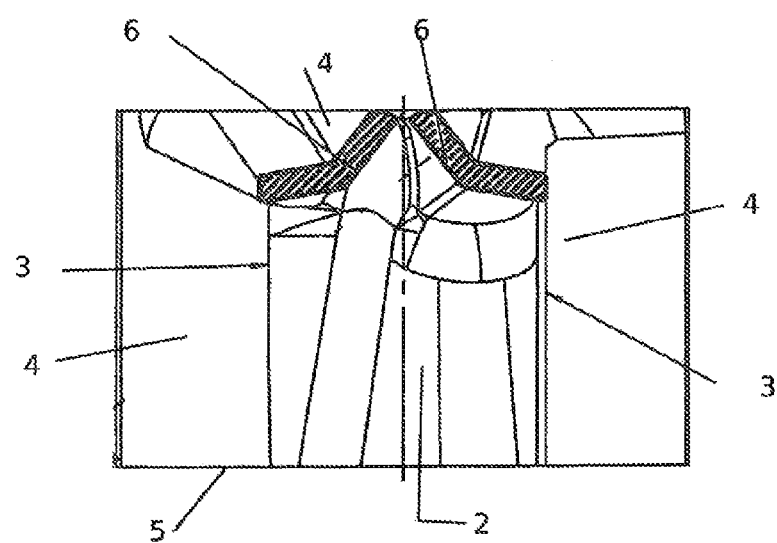
FIG. 2 shows the view of the essential part of the pinching jaw in a simplified form.

Details of the depression 2 and the receiving space 4 surrounding it can be gathered from FIG. 2. As already mentioned, the depression 2 is bounded to the right and left, i.e. at the longitudinal sides, extending parallel to one another, of the depression, by in each case one pinching edge 3. The distance of the pinching edges 3 from one another corresponds to the diameter of the wire nail, at the front end, to be arranged in the depression 2, of which the drilling tip is intended to be integrally formed.

The upper end in FIG. 1 and FIG. 2 of the depression 2 is separated from the receiving space 4 by two shearing edges 6 illustrated in a hatched manner in FIG. 2.

The shearing edges are formed such that they carry out shearing of the material present between them in interaction with the second pinching jaw of the pair of pinching jaws when the pair of pinching jaws is moved together. This also means that they protrude as far as the separation plane between the pair of pinching jaws 1, while the pinching edges 3 extend only as far as shortly before the separation plane, in order to leave residual material there during pinching, the bulge being held on the screw by way of said residual material.

Figure 3:
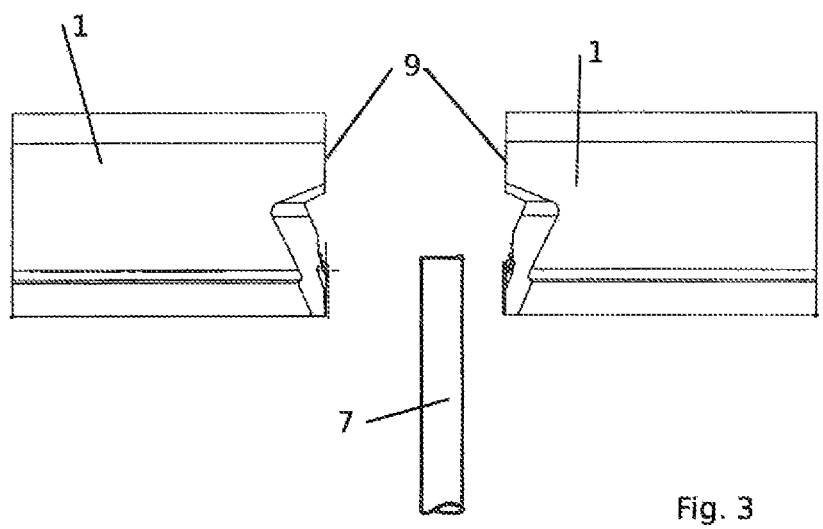
FIG. 3 shows a side view of two pinching jaws of a pair of pinching jaws.

FIG. 3 shows a pair of pinching jaws with the wire nail arranged between them. From this position, the two pinching jaws 1 are moved together until they almost come into contact with another, for example as far as a distance of about 0.01-0.05 mm. While the pinching jaws 1 are being closed, the end of the wire nail 7 is formed into the desired form of the drilling tip. The material, displaced in the process, of the end 8 of the wire nail 7 first of all flows both via the pinching edges 3 and via the shearing edges 6 into the receiving space 4. Only in the final section of the movement prior to the dead point of the movement of the two pinching jaws at the minimum distance between their end faces 9, see FIG. 3, is the material severed along the two shearing edges 6. Thus, the cutting edges 10 of the front end 8 of the wire nail 7, that is to say the cutting edges 10 of the drilling tip, are then separated from the bulge 11 formed by the displaced material.

Figure 4:
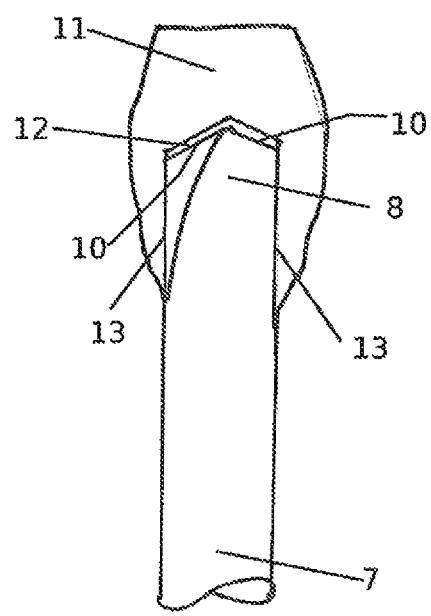
FIG. 4 schematically shows the view of the front end of a wire nail with drilling tip and bulge.

In a simplified and enlarged form. FIG. 4 shows this separation along the cutting edges 10 as a slit 12.

The scores 13 formed by the pinching edges 3 form a predetermined breaking point, so that, after the ejection of the blank provided with a drilling tip, the bulge 11 can be separated from said blank.

The drilling tip formed with the aid of these rolling jaws using the method described is suitable as a drilling tip for a screw, but also as a drilling tip for a drill bit, in particular when this is a disposable drill bit. However, such a drilling tip can also be used in the case of gun rivets or in the case of drill rivets.

The invention claimed is:

1. Method for producing a drilling tip, in particular the drilling tip of a screw, having the following method steps:
   a wire nail (7) is positioned with one end (8) in an intermediate space between two spaced-apart pinching jaws (1),
   the pinching jaws (1) are moved together,
   when the pinching jaws (1) are closed, the drilling tip is formed between the two pinching jaws (1),
   when the pinching jaws (1) are closed, excess material is displaced into a bulge (11) surrounding the end (8) of the wire nail (7),
   the bulge (11) is deformed at longitudinal sides of the wire nail (7) in order to form a predetermined breaking point,
   the bulge (11) is separated from the wire nail (7) along cutting edges (10) of the drilling tip during the deformation,
   after the drilling tip is removed, the bulge (11) is sheared off the wire nail (7).

2. Method according to claim 1, wherein two identical pinching jaws (1) are used.

3. Method according to claim 1, wherein, in order to separate the bulge (11) from the drilling tip, the bulge (11) is sheared off along the cutting edges (10).

4. Method according, to claim 1, wherein the separation between the bulge (11) and the wire nail (7) extends along the entire length of the cutting edges (10).

5. Screw having a drilling tip, which is producible by the method according to claim 1.

6. Pair of pinching jaws for producing a drilling tip, in particular a drilling tip of a screw, wherein
   each pinching jaw (1) has
      a depression (2) which forms a negative form of the drilling tip in a closed state of the pinching jaws (1), and
      a receiving space (4) surrounding the depression (2) and receiving the material displaced during the production of the drilling tip,
      a first boundary between the depression (2) and the receiving space (4) being formed along two sides extending parallel to a longitudinal axis of the depression such that the two pinching jaws (1) do not come into contact at the first boundary in the closed state of the pair of pinching jaws, and
      a second boundary between the depression (2) and the receiving space (4) being formed along two cutting edges (10) to be produced such that the two pinching jaws (1) come at least partially into contact or overlap at this boundary in the closed state of the pair of pinching jaws.

7. Pair of pinching jaws according to claim 6, wherein the boundary between the depression (2) and the receiving space (4) has a pinching edge (3) along at least one longitudinal side in the case of at least one pinching jaw (1).

8. Pair of pinching jaws according to claim 6, wherein the boundary between the depression (2) and the receiving space (4) has a cutting edge or shearing edge (6) along the two cutting edges (10) to be produced of the drilling tip in the case of at least one pinching jaw (1).

9. Pair of pinching jaws according to claim 6, wherein the two pinching jaws (1) are formed in an identical manner.

* * * * *